Sept. 20, 1971  F. A. O'LOUGHLIN  3,606,427

POWDERED METAL FRANGIBLE SEAL

Filed April 27, 1970

CLAMP TOOL

INVENTOR.
FRANCIS A. O'LOUGHLIN

BY
Thomas M. Marshall
ATTORNEY

United States Patent Office 3,606,427
Patented Sept. 20, 1971

3,606,427
POWDERED METAL FRANGIBLE SEAL
Francis A. O'Loughlin, Scotch Plains, N.J., assignor to Thomas & Betts Corporation, Elizabeth, N.J.
Filed Apr. 27, 1970, Ser. No. 31,957
Int. Cl. B65d 33/34
U.S. Cl. 292—307R ......... 7 Claims

ABSTRACT OF THE DISCLOSURE

A frangible seal is disclosed as including a powdered metal sleeve which includes a weakened area. The frangible seal is designed to firmly grip two or more members adjacent each other and upon the members being pulled away from each other fracture the sleeve along its weakened area to provide a visual indication of the members having been separated from each other.

BACKGROUND OF THE INVENTION

In many different situations it is desirable to be able to place two or more members in the vicinity of each other and provide a frangible seal that will firmly hold the members adjacent each other. Preferably, the frangible seal should allow the members to be easily separated from each other and provide a visual indication in some manner that the members were separated from each other even if the members should later be brought adjacent each other. The reason for the need to provide the visual indication is that many times the members are controls for a fire extinguisher, a meter, a vacuum seal, etc. and it is important to know if the controls were activated by being moved away from each other to know if the fire extinguisher was discharged, etc.

DESCRIPTION OF THE PRIOR ART

Heretofore some prior art frangible seals were made of wax, or other permeable materials as well as ductile materials. However, these prior art frangible seals often did not securely hold the activating members adjacent each other thus detracting from the usefulness. Additionally, some of these frangible seals could be reapplied to the members after the members were separated from each other, thus possibly providing a false indication that the members had not been separated from each other to actuate a device when in fact they had been.

SUMMARY OF THE INVENTION

It is thus apparent that if a frangible seal could be designed to securely hold two or more members adjacent each other and provide a visual indication if the members were at one time separated from each other it would find widespread use.

It is therefore an object of the present invention to provide an improved frangible seal for holding two or more members adjacent each other.

A further object of the present invention is to provide a frangible seal that can firmly hold two or more members adjacent each other and upon the members being removed from the vicinity of each other provide a visual indication that the members had been separated from each other even if the members are later brought adjacent each other.

Another object of the present invention is to provide a frangible seal that can firmly grip two or more members adjacent each other and that will provide a visual indication if the members are separated from each other even if the members are subsequently brought adjacent each other, the frangible seal being simple to manufacture and reliable in operation.

Briefly, in accordance with the present invention, the foregoing and other objects are accomplished by utilizing a sleeve made from a powdered metal. The sleeve is weakened in a particular area, as by notching an inside surface of the sleeve or by scoring an outside surface of the sleeve, so that when the sleeve is compressed on to a plurality of members a subsequent separation of the members will result in a tensile force being applied to the weakened area of the sleeve to fracture the sleeve, the fracture providing a visual indication that the members had been separated from each other.

DESCRIPTION OF THE DRAWINGS

Other objects and aspects of the present invention will be further apparent from the following description and drawings in which.

Figure 1:
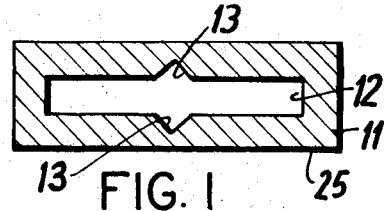
FIG. 1 is a cross-sectional view along lines 1—1 of the embodiment of the present invention shown in FIG. 2.
Figure 2:
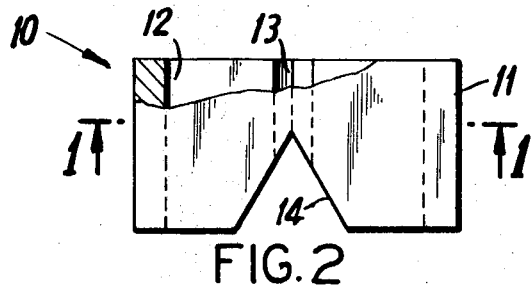
FIG. 2 is cross-sectional plan view of an embodiment of the present invention.

Referring now to the drawings, and more particularly to FIGS. 1 and 2, where a frangible seal 10 in accordance with the present invention is seen to include a sleeve 11 having a bore 12 in its interior. Bore 12, while shown in this embodiment of the present invention as approximately rectangular, could also be of a different configuration without departing from the scope of the invention, e.g., eliptical, oblong, etc. The inside of sleeve 11 includes V-shaped notches 13 which extend along the height of the sides of the sleeve in facing relation to each other at the longitudinal center of bore 12, with the bottom of each notch having a cutaway 14.

Preferably frangible seal 10 is made from powdered metal base of the types listed below with each type so listed having a density and sintering temperature as indicated.

| Material | Density, g./c.c. | Sintering temperature, °F. |
|---|---|---|
| Copper | 6.68–7.57 | 1,600–1,890 |
| Iron | 5.90–6.68 | 1,850–2,100 |
| 70/30 brass | 6.28–7.13 | 1,500–1,600 |
| Nickel | 6.28–7.57 | 1,850–2,100 |
| Steel | 5.90–6.68 | 1,850–2,100 |
| Aluminum | 2.02–2.30 | 1,050–1,200 |

Figure 5:
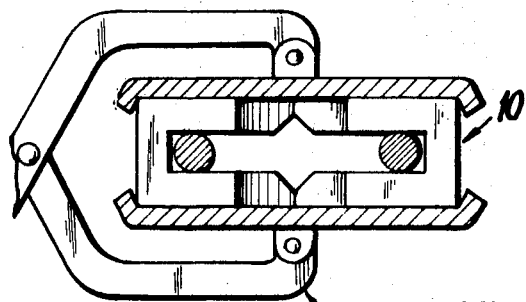
FIG. 5 illustrates how the embodiment of FIGS. 1 and 2 may be utilized to hold two members adjacent each other.

In operation two members, such as a pair of wires, a post and a wire, etc. are placed adjacent and in contact with each other with each member being located in a notch. A tool (FIG. 5) applies a compressive force to the sleeve to securely press-fit the sleeve about the members and hold the members adjacent each other. The sleeve will not fracture due to the compressive force applied to it by the tool since the compressive force will merely force the powdered metal particles against each other.

When it is desired to move the members away from each other the members are merely pulled normal to each other with the force exerted in moving the members away from each other applying a tensile force to sleeve 11 and in particular a tensile force to notches 13.

Due to the reduced cross-sectional area of notches 13 the area about the notch will have the highest stress level of any section of the sleeve and will fracture as the members are pulled away from each other. It is noted that the powdered metal in sleeve 11 will fracture when a large enough tensile force is applied thereto since the tensile force will pull the powdered particles away from each other breaking the bond between the particles. The members cannot slide relative to each other so as to become separated after being placed in the sleeve and after the sleeve has been crimped tightly about the members due to the gripping of the sleeve, and can only be separated from each other by being pulled away from each other. The force necessary to exert on the members to fracture the sleeve can be determined by the thickness of the sleeve and the depth of the notch therein.

Thus the only way to separate the members from each other is to pull them apart from each other which will fracture the sleeve providing a visual indication of the members being separated from each other, the visual indication being the fractured sleeve.

Figure 3:
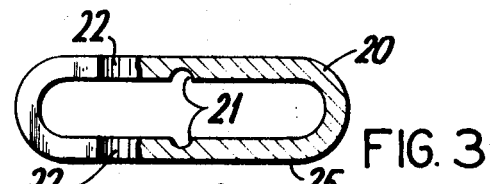
FIG. 3 is a cross-sectional view along lines 3—3 of the embodiment of the invention shown in FIG. 4.
Figure 4:
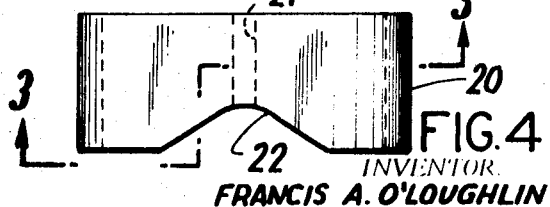
FIG. 4 is a cross-sectional plan view of an embodiment of the present invention.

Referring now to FIGS. 3 and 4 where a second embodiment of the invention is seen to include a rounded elongated sleeve 20 that includes a pair of rounded notches 21 on the interior of the sleeve which extend for a substantial height of the sleeve and are in facing relation with each other at the longitudinal center of the sleeve. Notches 21 can be formed on the interior of sleeve 20 in any of the ways available to the skilled mechanic and preferably extend to the height of sleeve 20 parallel to each other. A cutaway portion 22 is formed in the bottom of each notch as seen in FIG. 4.

The frangible seal of FIGS. 3 and 4 can be used in an identical manner as the frangible seal disclosed in FIGS. 1 and 2. That is to say, a pair of members such as a wire and a post, a pair of wires, etc. can be placed with each member disposed at opposite ends of the bore. A compressive force is applied to the sleeve to force the sleeve tightly about the members with the members tightly in their respective positions. When it is desired to move the members away from each other to actuate the system the members control, a force is applied to the different members in opposite directions to pull the members apart. This transmits a tensile force to the sleeve and the stress applied to the sleeve will be the greatest in the area of the notches and will, as a force is applied to the members to pull them apart, fracture the sleeve to provide a visual indication of the members being separated from each other.

As an alternative to notching the sleeves of FIGS. 1–4 the exterior of each sleeve, as at parts 25 thereof, can be scored to provide an area of weakness in the sleeve by any of the techniques available to the skilled worker in the art. When the sleeve is scored the depth of the score will, along with the composition of the sleeve, determine the force needed to be exerted by the members against the sleeve to fracture the sleeve to allow the members to be separated from each other.

In operation the scored sleeve will have at least two members placed in its interior and a compressive force will be applied to the sleeve to have the sleeve tightly grip the members adjacent each other. When the members are pulled apart from each other a tensile force is applied to the scored sleeve fracturing the sleeve along the scored areas to provide a visual indication that the members have been separated from each other.

Figure 6:
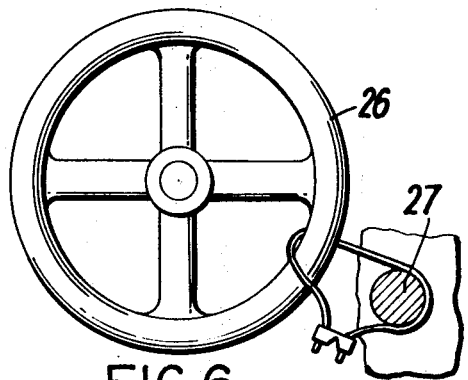
FIG. 6 illustrates how the present invention may be used to indicate rotation of a rotary control member.
Figure 8:
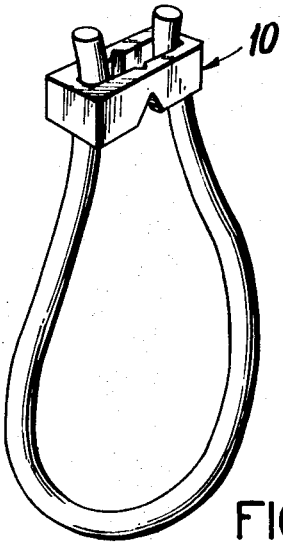
FIG. 8 illustrates how a wire may be looped through a frangible seal of the present invention so that if a force is exerted the wire will rupture the frangible seal.

As shown in FIG. 6, a wire can be looped through a control wheel 26 for a valve, etc. and looped about a post 27 with the ends of the wire crimped by the frangible seal as illustrated in FIG. 8 so that rotation of the wheel will result in fracture of the frangible seal. The wheel can be used to control a valve, an electrical switch, etc. and upon rotation of the wheel to actuate the element it is connected to, the frangible seal will be broken to indicate this actuation.

Figure 7:
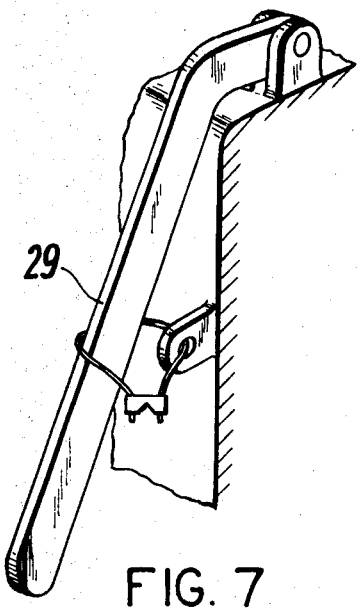
FIG. 7 illustrates how the present invention may be used to indicate movement of a control lever.

The frangible seal of the present invention can also be used to indicate movement of a lever 29 (FIG. 7) where the lever could be a control lever or cabinet handle, etc.

Another use for the frangible seal of the present invention is to grip the actuating members of a fire extinguisher together wherein when the members are pulled apart from each other the extinguisher releases its fire fighting contents. With the members pulled apart from each other to actuate the extinguisher the sleeve will be fractured, as previously described, and an inspector looking at the fire extinguisher to see if it is in its loaded condition can, upon seeing the sleeve fractured, tell that the contents thereof have been discharged. Similarly, the sleeve can be inscribed with information on it, as for example, the date the sleeve was placed on the actuating members. Alternatively the sleeve can be decorated to give it a pleasing appearance.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A frangible seal for holding two or more members adjacent each other comprising:
    (a) a powdered metal sleeve,
    (b) said sleeve having an internal slot, and a weakened area having fracture resistance less than the remainder of said sleeve whereby a pair of members may be inserted in said slot and a compressive force applied to said sleeve to firmly hold the members adjacent each other with said sleeve fracturing at said weakened area as said members are pulled away from each other.

2. A frangible seal according to claim 1 wherein said weakened area of said sleeve includes at least one scored surface of said sleeve.

3. A frangible seal according to claim 1 wherein said weakened area of said sleeve is formed by at least one notch extending continuous with said slot for a substantial part of the height of said sleeve.

4. A frangible seal according to claim 3 wherein the part of said sleeve directly below said notch is cutaway and said notch extends to said cutaway portion.

5. A frangible seal according to claim 4 wherein a second notch identical to said first notch is disposed continuous with said slot and opposite said first notch.

6. A frangible seal according to claim 5 wherein said slot is rectangular in cross-section with said notches located on opposite elongated sides of said slot.

7. A frangible seal according to claim 5 wherein said slot is generally rectangular with said notches being curved and on the opposite elongated sides of said slot.

References Cited

UNITED STATES PATENTS

| | | | |
|---|---|---|---|
| 961,333 | 6/1910 | Aylsworth | 292—307 |
| 1,039,576 | 9/1912 | Mueller et al. | 292—307UX |
| 1,416,683 | 5/1922 | Brooks | 292—307X |
| 2,654,624 | 10/1953 | Canter et al. | 292—308 |
| 2,809,859 | 10/1957 | Moberg | 292—308 |
| 3,326,589 | 6/1967 | Wenk | 292—307 |

DONALD A. GRIFFIN, Primary Examiner